(12) United States Patent
Holbein et al.

(10) Patent No.: US 8,561,932 B2
(45) Date of Patent: Oct. 22, 2013

(54) FRICTION COUPLING FOR A REVERSIBLE BELT TENSIONER

(75) Inventors: Wolfgang Holbein, Alfdorf (DE); Martin Prokscha, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 223 days.

(21) Appl. No.: 12/852,659

(22) Filed: Aug. 9, 2010

(65) Prior Publication Data

US 2011/0056789 A1    Mar. 10, 2011

Related U.S. Application Data

(62) Division of application No. 11/052,390, filed on Feb. 7, 2005, now abandoned.

(30) Foreign Application Priority Data

Feb. 19, 2004    (DE) .......................... 10 2004 008 173

(51) Int. Cl.
| | | |
|---|---|---|
| *B65H 75/30* | (2006.01) | |
| *F16D 7/02* | (2006.01) | |

(52) U.S. Cl.
USPC .......................................... 242/394.1; 464/40

(58) Field of Classification Search
USPC ........... 242/394.1; 188/77 R; 192/33 R, 33 C, 192/101; 464/37, 40, 41, 43, 45, 47
See application file for complete search history.

(56) References Cited

U.S. PATENT DOCUMENTS

| | | |
|---|---|---|
| 1,455,372 A | 5/1923 | Wick |
| 1,584,361 A | 5/1926 | Fishel |
| 1,803,231 A | 4/1931 | Camblin |
| 2,533,848 A | 12/1950 | Swilik |
| 2,636,578 A | 4/1953 | Swift |
| 2,779,175 A | 1/1957 | Le Hew |
| 3,405,791 A | 10/1968 | Kaplan |
| 3,648,810 A | 3/1972 | Weatherby |
| 3,691,791 A | 9/1972 | Yoshii |
| 3,893,554 A | 7/1975 | Wason |
| 3,905,562 A | 9/1975 | Kell |
| 4,538,931 A | 9/1985 | Nagashima |
| 4,687,156 A | 8/1987 | Mori |
| 5,058,720 A | 10/1991 | Rude et al. |
| 5,275,262 A | 1/1994 | Ojima et al. |
| 6,454,201 B1 | 9/2002 | Strobel et al. |
| 6,589,121 B1 | 7/2003 | Leonard |
| 6,840,474 B2 | 1/2005 | Honl et al. |
| 2008/0268964 A1* | 10/2008 | Kim ................................ 464/47 |
| 2011/0089280 A1* | 4/2011 | Ando et al. .................... 242/374 |

FOREIGN PATENT DOCUMENTS

| | | |
|---|---|---|
| DE | 2044716 | 1/1972 |
| DE | 3301312 | 7/1983 |
| DE | 4212292 | 10/1993 |

(Continued)

*Primary Examiner* — Michael Mansen
*Assistant Examiner* — Stefan Kruer
(74) *Attorney, Agent, or Firm* — Tarolli, Sundheim, Covell & Tummino LLP

(57) ABSTRACT

A friction coupling has a drive part, an output part, and a friction element which can transfer a friction moment between the drive part and the output part. A release element is provided which after a predetermined rotation angle of the friction coupling can act on the friction element so that a reduction of the friction moment occurs.

25 Claims, 6 Drawing Sheets

(56) References Cited

FOREIGN PATENT DOCUMENTS

| DE | 20115316 | 3/2002 |
| DE | 10234501 | 2/2004 |
| EP | 0048516 | 3/1982 |
| EP | 0133226 | 2/1985 |
| JP | 60196434 | 4/1985 |

* cited by examiner

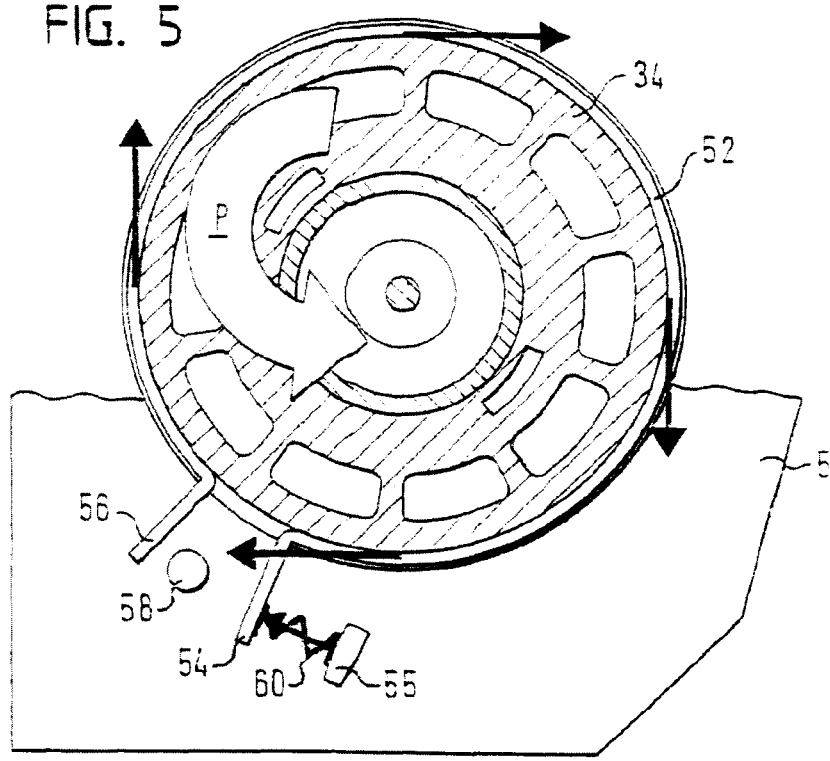
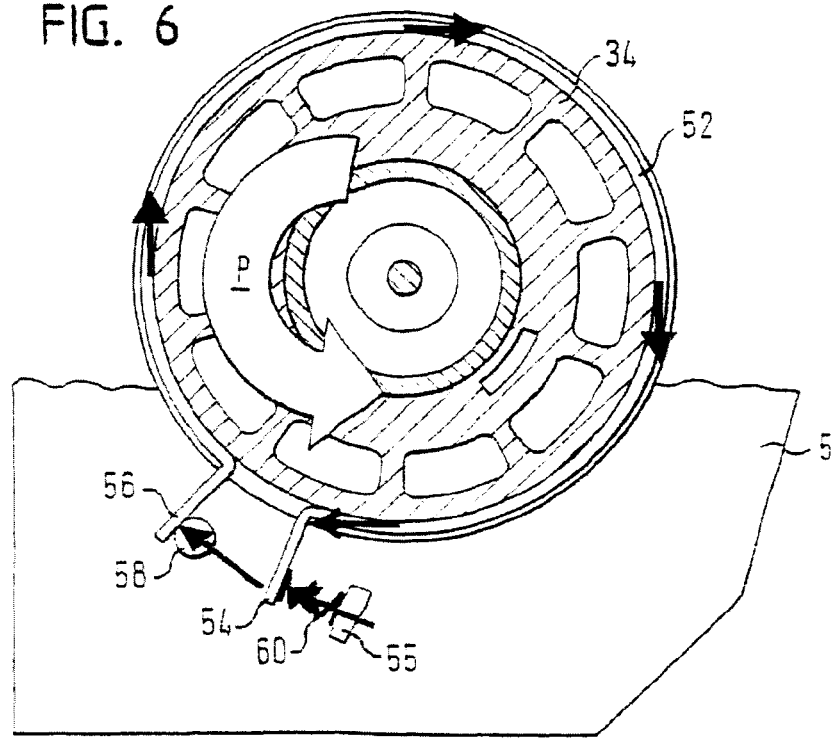

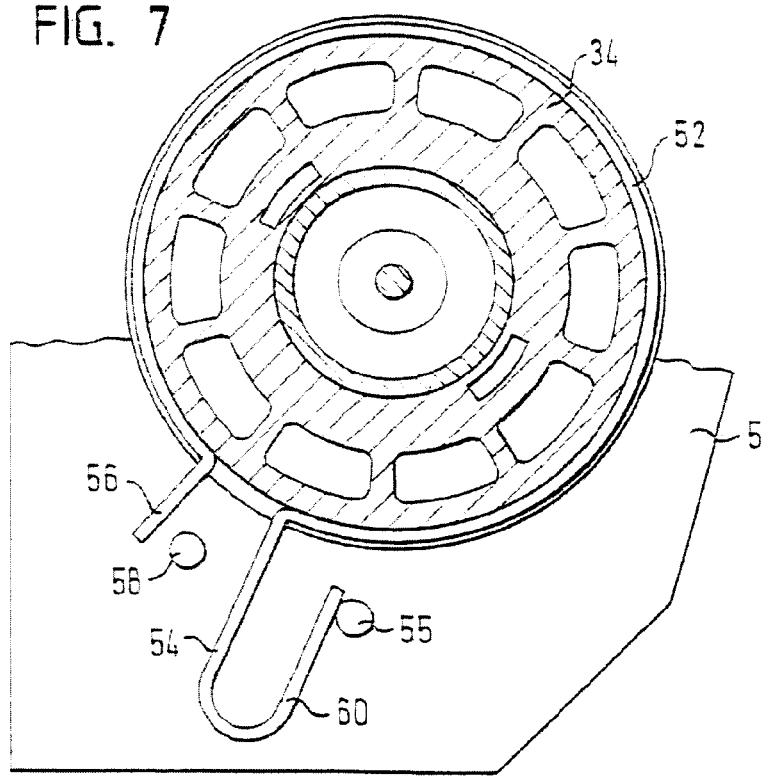
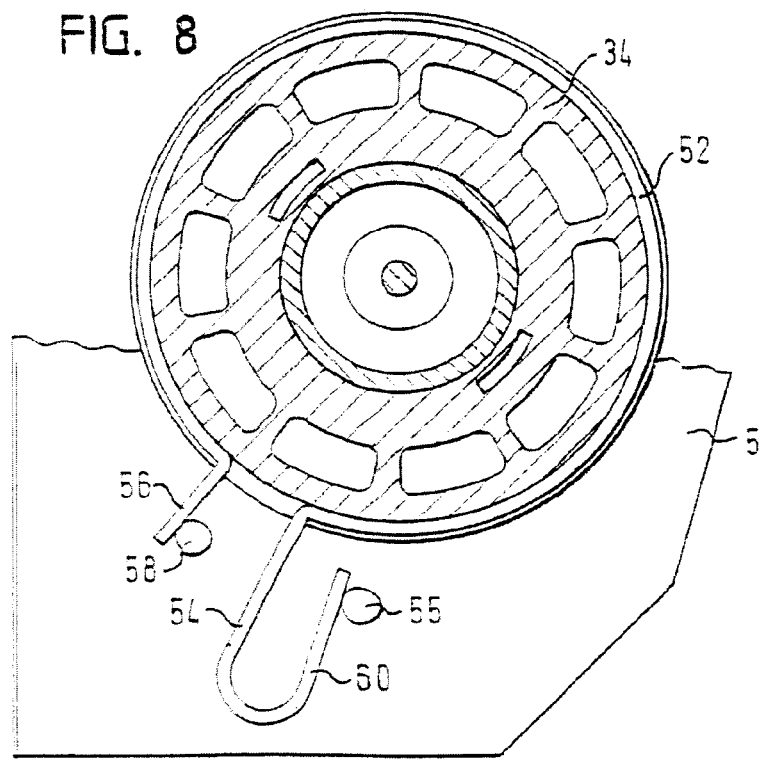

FRICTION COUPLING FOR A REVERSIBLE BELT TENSIONER

RELATED APPLICATION

This application is a divisional of U.S. patent application Ser. No. 11/052,390, filed Feb. 7, 2005 now abandoned.

The invention relates to a friction coupling with a drive part, an output part and a friction element which can transfer a friction moment between the drive part and the output part. The invention relates in particular to such a friction coupling which can be used in a vehicle occupant restraint system.

BACKGROUND OF THE INVENTION

Friction couplings can be used in various ways in vehicle occupant restraint systems. Examples of these are an arrangement for putting at rest for sensors, the drive of reversible belt tensioners, loop brakes, motion dampers in movable buckle extenders, rotation speed limiters in belt locking systems or the like. All friction couplings have in common here the fact that a defined prestressing of the friction element, a defined looping, angle and a particular friction factor are required. The friction moment provided by the friction coupling increases exponentially with an increasing looping angle and increasing friction value between the friction element and the component, on which the friction element engages.

Owing to the exponential course of the friction moment, the minimum friction moment transferred from the friction coupling can be adjusted comparatively simply within desired tolerances. This is more problematic with the maximum friction moment which can be transferred from the friction coupling. Deviations of the looping force of the friction moment from a nominal value upwards have a very much stronger effect on the friction moment than deviations downwards.

The object of the invention consists in further developing a friction coupling of the type initially mentioned to the effect that the friction moment transferred to a maximum from the friction coupling is limited.

BRIEF DESCRIPTION OF THE INVENTION

For this purpose, in accordance with the invention a release element is provided, which acts on the friction element after a predetermined rotation angle of the friction coupling so that a reduction of the friction moment is brought about. The invention is based on the basic idea of allowing the friction moment generated by the friction element to act at the start of the rotation moment transfer from drive part to output part in each case. Even if this friction moment is very much higher than is actually desired, this has a positive effect sooner on the operation of the friction coupling; it is therefore guaranteed under all circumstances that firstly a moment of rotation is transferred from drive part to output part. Only after the friction coupling has undertaken a predetermined rotation angle is the friction element acted upon via the release element, in order to delimit the friction moment which is able to be transferred at a maximum from the friction coupling. This ensures that in an operation phase of the friction coupling, after the predetermined rotation angle has been run through and a function associated with the corresponding rotation has been carried out, a precisely defined maximum friction moment is not exceeded. This ensures that in this operation phase, in which in particular a slipping through of the friction coupling occurs, no undesirably high friction moment is in action.

According to an embodiment of the invention, the release element is a stop at which an arm of the friction element comes to abut after the predetermined rotation angle has been run through. In this way, an opening force is exerted onto the friction element, which leads to a reduction of the friction force of the friction element and hence to a reduction of the friction moment transferred between the drive part and the output part.

BRIEF DESCRIPTION OF THE DRAWINGS

The invention is described below with the aid of a preferred embodiment which is illustrated in the enclosed drawings. In these:

FIG. 5 shows a diagrammatic side view of a friction coupling, used in the belt retractor of FIG. 1, in a first operating phase;

FIG. 6 shows the friction coupling in a second operating phase;

FIG. 7 shows an alternative development of the friction coupling in the first operating phase;

FIG. 8 shows the friction coupling of FIG. 7 in a second operating phase; and

DETAILED DESCRIPTION OF THE INVENTION

Figure 1:
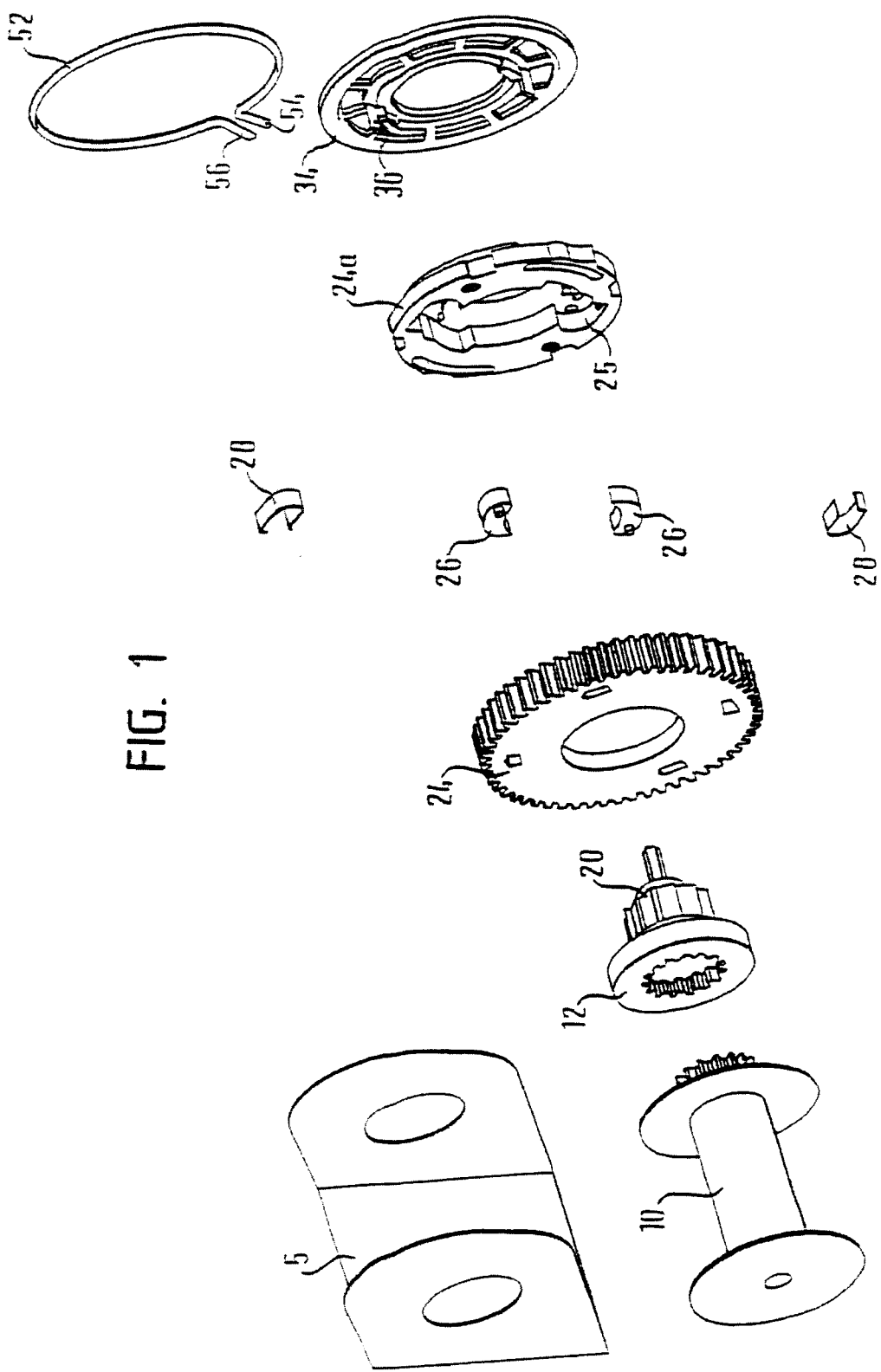
FIG. 1 shows a diagrammatic exploded drawing of a belt retractor with a friction coupling.
Figure 2:
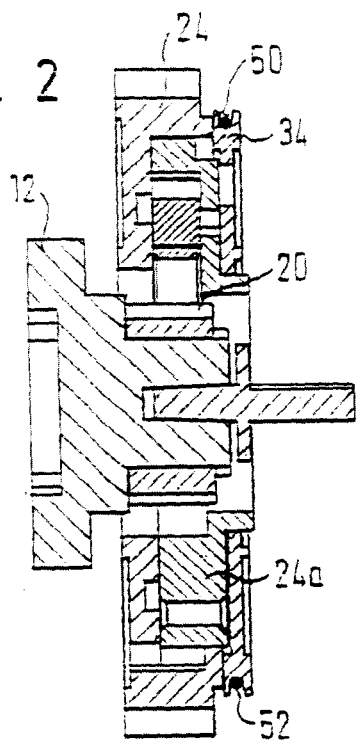
FIG. 2 shows a section through the components of FIG. 1 in installed state.

In FIG. 1 a belt retractor for a vehicle safety belt is shown in an exploded view, which has a frame 5, in which a belt spool 10 is rotatably mounted. Coupled with the belt spool so as to be secure with respect to rotation is a belt spool drive part 12, which has outer teeth 20. The outer teeth are part of a shifting coupling by means of which a drive moment can be transferred from a wheel 24 to the belt spool. The wheel 24 is connected with an electromotor (not illustrated) (see for example DE 201 15 316).

The wheel 24 has an insert part 24a in which several pockets 25 are formed, in which a catch 26 is arranged respectively, on which a restoring spring 28 acts. Each catch is arranged together with its restoring spring in one of the pockets 25, and the insert part 24a is arranged, for example arrested, on the wheel 24. The catches 26 are then held swivellably in the respective pocket.

Axially adjacent to the wheel 24, a coupling disc 34 is arranged, which is provided with control tongues 36 which project through recesses in the insert part 24a into the wheel 24, so that they can cooperate with the catches 26. The coupling disc 34, together with the wheel 24, the insert part 24a, the catches 26 and the outer teeth 20, forms a shifting coupling.

The coupling disc 34 is supported on the frame 5 by means of a friction coupling. The friction coupling has a friction element which is constructed here as a friction spring 52. The friction spring 52 is arranged in a groove 50 which is formed on the side of the coupling disc 34 facing away form the wheel 24. The internal diameter of the friction spring 52 is smaller in the initial state than the external diameter of the groove 50, so that the friction spring 52 sits in the groove 50 with a certain pre-stressing. The friction spring 52 is constructed as an annular spring which has a bent arm 54 at one end which acts as a closure arm and is supported on the frame 5 of the belt retractor so as to be secure with regard to rotation. For this purpose, a support element 55 is provided (see FIG. 5). The friction spring 52 has at its other end a bent arm 56 which acts as an opening arm and can cooperate with a release element 58 (see likewise FIG. 5), which is arranged on the frame 5. The friction spring 52 forms together with the coupling disc 34 and the support element 55 a friction coupling which makes possible a slipping through of the coupling disc 34 as soon as the friction moment between the friction spring and the groove 50 of the coupling disc 34 is overcome. Depending on the direction of rotation of the coupling disc 34, either the coupling disc 34 or the support element 55 acts as drive part; the other of the two acts as output part.

Figure 3:
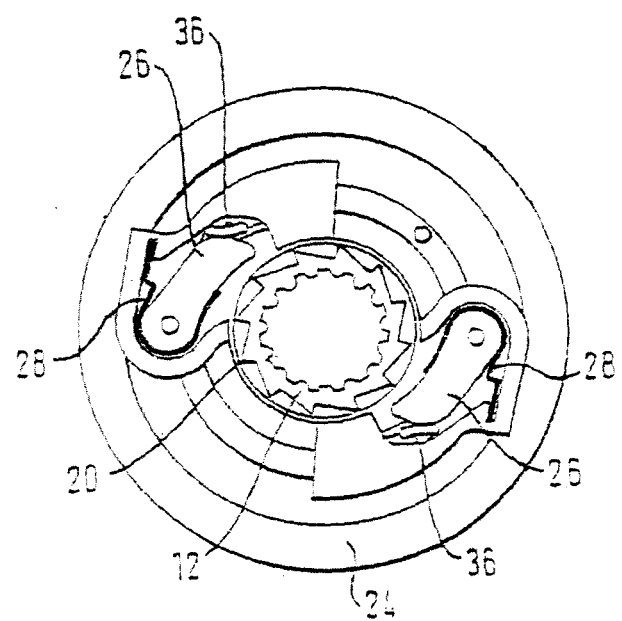
FIG. 3 shows a side view of a shifting coupling, used in a belt retractor, in an initial position.
Figure 4:
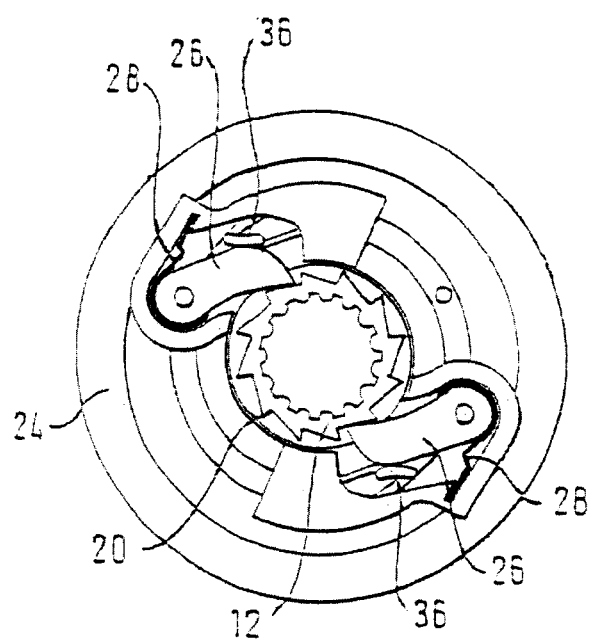
FIG. 4 shows a side view of the shifting coupling in coupled state.

The operation of the shifting coupling (see FIGS. 3 and 4) and of the friction coupling (see FIGS. 5 and 6) is described below. In the initial position of the shifting coupling (see FIG. 3), the catches 26 are held back by the restoring springs 28 so that they are not in engagement with the outer teeth 20 of the belt spool drive part 12. In this case, the belt spool 10 can freely rotate and belt hand can be withdrawn from the belt spool.

If the wheel 24 is set in rotation by the electromotor (not illustrated), the catches are entrained. As the coupling disc 34 is secured by means of the friction spring 52, the catches 26 run onto the control tongues 36, whereby they are guided into the outer teeth 20 (see FIG. 4). Now the wheel 24 is coupled with the belt spool 10, so that the electromotor (not illustrated) can drive the belt spool in the winding direction of the safety belt, whereby a pre-tensioning is carried out. In so doing, the coupling disc 34 is entrained via the control tongues 36 (see arrow P in FIG. 5), which is possible without difficulty, because of the friction coupling between the coupling disc and the frame 5 of the belt retractor.

The friction coupling is set so that the friction moment exerted by the support element 55 via the closure arm 54 and the friction spring 52 onto the coupling disc 34 is in every case so great that the catches of the shifting coupling can be guided in. To increase the minimum friction moment of the friction coupling, a spring 60 can be provided, which is arranged between the support element 55 and the closure arm 54 of the friction spring 52 and pre-stresses the closure arm 54 in the direction of closure of the friction spring 52.

During the rotation of the coupling disc 34 in the direction of the arrow P, a differentiation is to be made between two different cases. In a first case, the friction moment which is provided is higher than the required minimum friction moment, but not greater than a permissible maximum friction moment. In this case, the coupling disc 34 rotates inside the friction spring 52, which remains approximately stationary in its position shown in FIG. 5. In a second case, the friction moment provided by the friction coupling is greater than a permissible maximum friction moment (and hence, of course, also greater than the required minimum friction moment). In this state, the coupling disc 34, when it is rotated in the direction of the arrow P, entrains the friction spring 52 in an anticlockwise direction, which is permitted by the spring 60. After a predetermined rotation angle, the opening arm 56 abuts onto the release element 58, whereby the two arms 54, 56 of the friction spring 52 are moved apart. Thereby, the looping force of the friction spring 52 decreases and thereby also the friction moment provided by the friction coupling. In this way, it is reliably prevented that an undesirably high friction moment is in action.

In FIGS. 7 and 8, an alternative embodiment is shown. This differs from the friction coupling shown in FIGS. 5 and 6 in that the spring 60 is integrated into the closure arm 54. The closure arm 54 is in fact constructed with a bent end which is elastically flexible.

Figure 9:
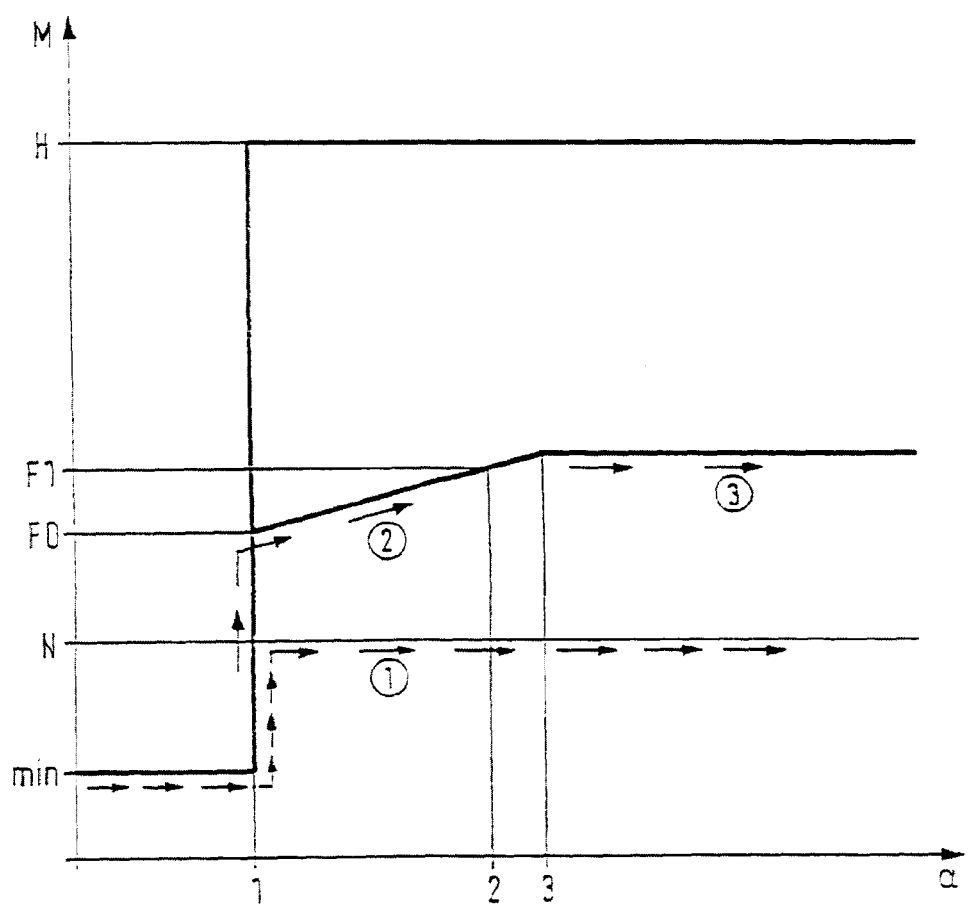
FIG. 9 shows a diagram of the friction moment transferred under various operating states from the friction coupling.

The path of the friction moment M, transferred from the friction coupling, over a rotation angle α is illustrated for various operating states with the aid of FIG. 9. "Min" designates the moment of rotation which is necessary for guiding in the catches. "N" designates the moment of rotation which is provided as a minimum by the friction coupling. "H" designates the moment of rotation which is provided as a maximum by the friction coupling.

At the start of the rotation of the wheel 24, the moment necessary for guiding in the catches 26 acts in the friction coupling. As soon as the catches are guided in (rotation angle 1), the acting moment of rotation increases, because the coupling disc 34 now has to be entrained. Assuming that the friction coupling provides a comparatively low friction moment, the acting moment of rotation rises for example up to the level N and remains at this level over the further rotation angle (Path 1). If, on the other hand, the friction coupling provides a high moment of rotation, then starting from the complete guiding in of the catches 26, the acting moment of rotation would rise to the level H and then remain at this level over the further rotation angle. This would be undesirable and is prevented. Owing to the spring 60, the friction spring 52 in fact co-rotates as soon as a force F0 acts on it. Thereby, the rise in the moment of rotation is limited and the friction spring 52 can be rotated contrary to a rising moment of rotation; the increase in this range (Path 2) is determined by the elastic rigidity of the spring 60. At point 2 of the rotation of the friction coupling, the opening arm 56 arrives in abutment against the release element 58, and at point 3 the inherent elasticity of the opening arm 56 is "used up", so that the friction spring 52 is now opened. Therefore, the acting moment of rotation remains over the further rotation angle at a level which lies considerably below the maximum friction moment H (Path 3).

The path of the friction moment of the friction coupling can be set through the construction of the spring 60 and also the positioning of the support element 55 and of the release element 58. It is also possible to arrange the support element 55 and/or the release element 58 displaceably on the frame 5 of the belt retractor, so that for example different states can be connected in depending on external parameters. These states can be connected for example through a belt winding scanning, a control via a gear similar to a chid's safety mechanism, by the linear adjustment of a vertical adjuster, by the movement of the belt buckle, by a relative movement in a locking system between coupling disc and retractor axis or a movement of an end fitting of the safety belt. The adjustment of the support element and/or of the release element can also be controlled actively via an a actor, for example a holding magnet, a lifting magnet, an electromotor or the like.

The friction coupling according to the invention was described here as part of a reversible belt tensioner. However, a variety of other possibilities of application are conceivable. For example, the friction coupling can be used for putting the sensor at rest with limitation of the friction force. It is also possible to use the friction coupling as part of a recoil brake of a belt retractor, which prevents an abrupt braking of the belt spool with a rapid belt band return (and thereby triggers a blocking of the belt spool) by braking of the belt spool in line with a specific objective. It is also possible to use the friction coupling for damping lock movements. It is also possible to use the friction coupling for a damped deflection fitting on the vertical adjuster as a function of the deflection angle and of the position of the vertical adjuster. The friction coupling can also be used in reversible tensioning processes, the force level acting on the belt band being kept by a loop spring and thereby a guiding in of the locking system being prevented. A reduction of the belt band force can be realized here by means of a movement of the housing mounting without an intrusive release impulse. The friction coupling can also be used in lock extender systems to limit the elastic force in swivel movements. The friction coupling can also be used in locking systems in order to vary the elastic force for catch guiding depending on the movement of rotation and hence to favourably influence the dynamics, restoring behaviour, belt locking and de-rattling. For example, with a return movement a higher force can act on the inertia disc, in order to actuate a return unblocking by means of different force levels and hence to achieve a minimum return rotation angle.

The invention claimed is:

1. An apparatus comprising:
a reversible belt tensioner including a friction coupling with a drive part that is movable in a first driving direction and a second direction opposite the first direction, the reversible belt tensioner applying a moment to the drive part in the first driving direction;
an output part;
a friction element which transfers a friction moment between the drive part and the output part only during pre-tensioning of the belt, the friction moment acting in the second direction; and
a release element which, after a predetermined rotation angle of the friction coupling in the first driving direction of the drive part, acts on the friction element to cause a reduction in the friction moment.

2. The apparatus according to claim 1, wherein the moment can be applied to the drive part to move the drive part in the first driving direction while the release element acts on the friction spring.

3. The apparatus according to claim 2, wherein the friction element is a loop spring that frictionally engages the periphery of the output part to inhibit rotation of the output part and thereby inhibit rotation of the drive part.

4. The apparatus according to claim 1, wherein the friction element comprises a friction spring that has a closure arm that cooperates with a support element, a second spring being arranged between the closure arm and the support element in order to adjust the friction moment.

5. The apparatus according to claim 1, wherein the support element is adjustable.

6. The apparatus according to claim 1 further comprising a shifting coupling for selectively coupling the friction element to the drive part, the shifting coupling having a first condition in which the friction element is decoupled from the drive part and a second condition in which the friction element transfers a friction moment between the drive part and the output part during pre-tensioning of the belt.

7. An apparatus comprising a reversible belt tensioner including a friction coupling with a drive part, an output part, and a friction element which transfers a friction moment between said drive part and said output part during pre-tensioning of said belt, said drive part being movable in a first driving direction and a second reverse direction, wherein a release element is provided which, after a predetermined rotation angle of said friction coupling in the first driving direction of the drive part, acts on said friction element so that a reduction of said friction moment occurs, said friction element being a friction spring, said friction spring having a closure arm which cooperates with a support element, a second spring being arranged between said closure arm and said support element.

8. The apparatus according to claim 7, wherein said friction spring is a loop spring.

9. The apparatus according to claim 8, wherein the loop spring frictionally engages a periphery of the output part to inhibit rotation of the output part and thereby inhibit rotation of the drive part.

10. The apparatus according to claim 7, wherein said friction spring is an annular spring.

11. The apparatus according to claim 7, wherein said second spring is constructed as a separate component.

12. The apparatus according to claim 7, wherein said second spring is formed by an extension of an opening arm of said friction spring.

13. The apparatus according to claim 7, wherein said release element is a stop.

14. The apparatus according to claim 7, wherein the drive part is movable in the first driving direction in response to belt pre-tensioning and the release element acts on the friction element in response to belt pre-tensioning.

15. The apparatus according to claim 7, wherein the friction element only transfers the friction moment between the drive part and the output part in response to belt pre-tensioning.

16. The apparatus according to claim 7, wherein the friction moment increases until the release element acts on the friction element.

17. The apparatus according to claim 7, wherein the drive part is movable in the first driving direction while the release element acts on the friction element.

18. The apparatus according to claim 7 further comprising a shifting coupling for selectively coupling the friction element to the drive part, the shifting coupling having a first condition in which the friction element is decoupled from the drive part and a second condition in which the friction element transfers a friction moment between the drive part and the output part during pre-tensioning of the belt.

19. An apparatus comprising a reversible belt tensioner including a friction coupling with a drive part, an output part, and a friction element which transfers a friction moment between said drive part and said output part during pre-tensioning of said belt, said drive part being movable in a first driving direction and a second reverse direction, a release element being provided which, after a predetermined rotation angle of said friction coupling in the first driving direction of the drive part, acts on said friction element so that a reduction of said friction moment occurs, said friction element being a friction spring, said friction spring having a closure arm which cooperates with a support element, said support element being adjustable.

20. The apparatus according to claim 19, wherein the friction element only transfers the friction moment between the drive part and the output part in response to belt pre-tensioning.

21. The apparatus according to claim 19, wherein the friction moment increases until the release element acts on the friction element.

22. The apparatus according to claim 19, wherein the drive part is movable in the first driving direction while the release element acts on the friction element.

23. The apparatus according to claim 19, wherein the drive part is movable in the first driving direction in response to belt pre-tensioning and the release element acts on the friction element in response to belt pre-tensioning.

24. The apparatus according to claim 19, wherein the friction element is a loop spring that frictionally engages the periphery of the output part to inhibit rotation of the output part and thereby inhibit rotation of the drive part.

25. The apparatus according to claim 19 further comprising a shifting coupling for selectively coupling the friction element to the drive part, the shifting coupling having a first condition in which the friction element is decoupled from the drive part and a second condition in which the friction element transfers a friction moment between the drive part and the output part during pre-tensioning of the belt.

* * * * *